United States Patent
Galassi et al.

[19]

[11] Patent Number: 6,024,795
[45] Date of Patent: Feb. 15, 2000

[54] CONVEYANCE AND PROCESSING OF DYNAMO-ELECTRIC MACHINE COMPONENTS IN RESIN APPLICATION SYSTEMS

[75] Inventors: Rossano Galassi; Romano Lozzi; Sabatino Luciani; Federico Sbalchiero, all of Florence, Italy

[73] Assignee: Axis USA, Inc., Tampa, Fla.

[21] Appl. No.: 08/864,566

[22] Filed: May 28, 1997

Related U.S. Application Data

[60] Provisional application No. 60/019,185, Jun. 6, 1996.

[51] Int. Cl.$^7$ ........................................... B05C 5/00
[52] U.S. Cl. ............................... 118/322; 118/56
[58] Field of Search ................................. 427/543, 544, 427/318; 118/58, 320, 322, 66, 64, 56

[56] References Cited

U.S. PATENT DOCUMENTS

| | | |
|---|---|---|
| 4,249,068 | 2/1981 | Mangan et al. . |
| 4,407,854 | 10/1983 | Pan . |
| 4,963,391 | 10/1990 | Bair et al. . |
| 5,258,594 | 11/1993 | Pioch ..................................... 427/543 |

FOREIGN PATENT DOCUMENTS

| | | |
|---|---|---|
| 0 321 223 | 6/1989 | European Pat. Off. . |
| 0 622 128 | 2/1994 | European Pat. Off. . |
| 499224 | 11/1970 | Switzerland . |

*Primary Examiner*—Brenda A. Lamb
*Attorney, Agent, or Firm*—Fish & Neave; Robert R. Jackson; Brajesh Mohan

[57] ABSTRACT

A resin coating system includes a coating station for applying resin to dynamo-electric machine components such as electric motor armatures, one or more other stations adjacent to the coating station, a conveyor for transporting components through the coating station where the components are carried by holders holding at least one end of the components without touching the body portion of the components, another conveyor for transporting components through the other stations where the components are carried by holders supporting the body portion of the components, and a transfer device for transferring uncoated and coated components between the two conveyors. The holders attached to the conveyor in the coating station are capable of rotating the components about the longitudinal axis of each component during the coating operation for an even application of the resin to the component. The holders attached to the conveyor for transporting armatures through the other stations are of simpler and less expensive construction. Prior to resin application, the components may be heated by electrical resistance heating of their coils and by electromagnetic induction heating of their ferromagnetic cores.

23 Claims, 10 Drawing Sheets

CONVEYANCE AND PROCESSING OF DYNAMO-ELECTRIC MACHINE COMPONENTS IN RESIN APPLICATION SYSTEMS

This application claims the benefit of U.S. provisional application Ser. No. 60/019,185, filed Jun. 6, 1996.

BACKGROUND OF THE INVENTION

The present invention relates to improved solutions for conveying and processing dynamo-electric machine components (e.g., armatures or stators for electric motors, generators, or alternators) in resin application systems. These systems have process principles like those described in U.S. Pat. Nos. 5,401,531 and 5,443,643, which are hereby incorporated by reference herein.

More particularly, a typical resin application system involves impregnating or at least coating the wound coils of a dynamo-electric machine component by dropping liquid resin from a series of dispensers which become aligned with portions of the coil. While this dropping operation occurs, the dynamo-electric machine components rotate under the dispensers so that the resin becomes uniformly distributed on the coils. In traditional systems this operation is accomplished by holding the dynamo-electric machine components with holding devices like those shown in FIG. 4 of U.S. Pat. No. 5,443,643. These holding devices are fixed to a transport chain at a constant distance from each other and have collets for gripping a shaft of the dynamo-electric machine component (in this case an armature). By supporting the ends of the dynamo-electric machine components, these holding devices leave the body portion of the components free from support so that only the components and not the holding devices are coated with resin. A mechanism is also present to produce the rotation which has been described previously.

As an alternative to dropping the resin on the components, it is known to pass the components over a resin bath, which is raised so that a portion of the component is immersed in the resin. The component is then rotated by its holding device so that all portions of its circumference pass through the resin. The bath is lowered after all circumferential portions of the component have received resin.

The above-mentioned holding devices with component rotating capability are certainly satisfactory for manipulating the dynamo-electric machine components with respect to resin dispensers or a resin bath. However, they are expensive to manufacture and their cost becomes an even greater burden when the resin application system needs to have a long chain with a great number of holders to transfer the dynamo-electric machine components to additional equipment like a preheating oven, a curing oven, and/or a cooling plant.

There are other holding devices, such as those shown in FIG. 2 of U.S. Pat. No. 5,401,531, which can be used as satisfactorily as those referred to previously for transporting dynamo-electric machine components through a traditional resin application system. However, these other holders are just as expensive as those described initially.

In view of the foregoing, it is an object of this invention to provide solutions for avoiding the costly result described previously for a resin application system requiring a long chain transport for conveying dynamo-electric machine components through the system.

It is another object of the invention to provide a resin application system which uses two or more sets of dynamo-electric machine component holders, where the more expensive type of holders are used substantially only in the portions of the system where they are required.

Successful application of liquid resin typically requires the workpiece to be heated. For example, heating the workpiece may promote flow of the resin into the spaces or interstices between the wires in the coils of the workpiece. Indeed, it may be desirable to have such complete penetration or impregnation of the coils by the resin that the resin reaches the core of the workpiece via the coils. Optimum heating of the workpiece is desirable to produce the desired degree of resin penetration. Temperatures that are too high should be avoided to prevent premature curing (i.e., hardening) of the resin and/or gas bubble formation in the resin. Temperatures that are too low should also be avoided because the resin may not cure (harden) properly if it does not reach a high enough temperature.

As mentioned above, a preheating oven may be used to preheat the workpieces to the desired temperature for resin application. In order to make sure that all relevant portions of the workpiece are at the desired temperature, it may be necessary for the workpiece to stay in the preheating oven for a relatively long time. At high production rates this may necessitate a large preheating oven and a very long workpiece conveyor (with a large number of workpiece holders) through that oven. It may also be difficult and expensive to precisely regulate temperature in an oven, especially a large oven handling large numbers of workpieces at high production rates.

In view of the foregoing it is still another object of this invention to provide more economical, rapid, precise, and efficient preheating of workpieces for resin application.

SUMMARY OF THE INVENTION

These and other objects of the invention are accomplished in accordance with the principles of the invention by providing a system having a plurality of endless conveyors which transport dynamo-electric machine components to be coated with resin through all of the stations required for proper coating of the components. Such stations may include a preheating station, a resin coating station, a curing station, a cooling station, and/or a gelification station, as shown in greater detail in U.S. Pat. Nos. 5,401,531 and 5,443,643. In some of the stations, such as in the resin coating station, it may be desirable to use a first set of component-carrying holders that are capable of rotating the components during coating so that the resin is applied evenly to the components. In the other stations where rotation of the components is not necessary, it is preferable to use simpler holders of the present invention which accommodate a range of different sized components and yet are easier and less expensive to manufacture than the first set of holders.

Thus, in the resin application system of the present invention the expensive holding devices for transporting and presenting the components to resin dispensers or a resin bath are maintained, while less expensive and differently configured holding devices are used for transportation to other parts of the system.

In order to reduce or eliminate the need for preheating the workpieces in an oven, the coils of the workpieces may be heated by applying an electrical current to the coils and using the resistance of the coils to heat them. The electrical resistance of the coils may be monitored during such heating to ensure that the coils are heated to precisely the desired temperature. The ferromagnetic core of the workpiece (around which the coils are wound) may be heated by electromagnetic induction heating.

BRIEF DESCRIPTION OF THE DRAWINGS

Further features of the invention, its nature, and various advantages will be more apparent from the following detailed description of the preferred embodiments and the accompanying drawings, wherein like reference characters represent like elements throughout, and in which:

FIG. 2 is taken along the line 2—2 in FIG. 1.

FIG. 3 shows a holding device on a horizontal rather than vertical section of the transport chain.

FIG. 4 shows the holding device on a vertical section of the transport chain again.

DETAILED DESCRIPTION OF THE PREFERRED EMBODIMENTS

Figure 1:
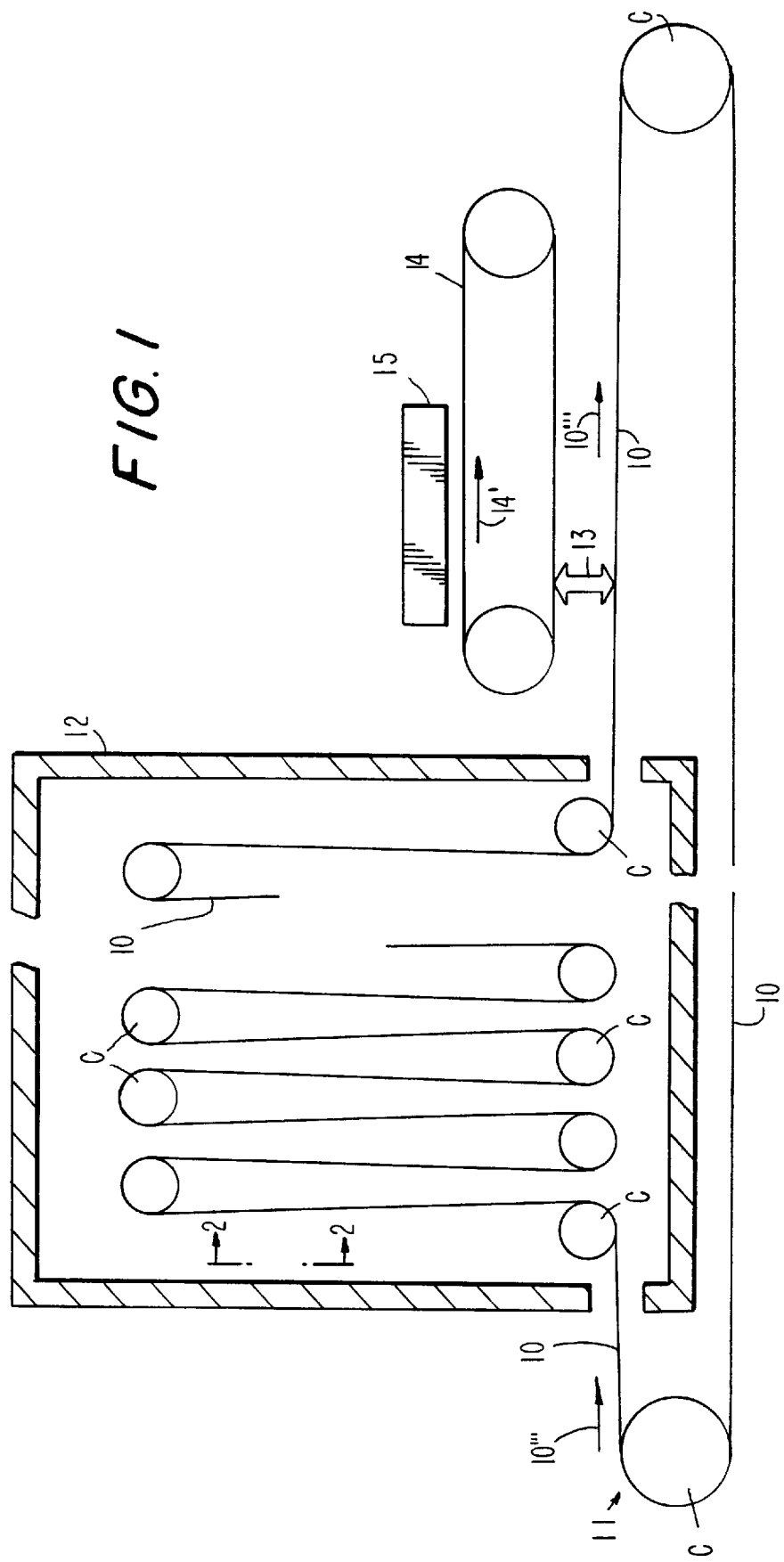
FIG. 1 is a schematic representation of an illustrative resin coating system which can be constructed in accordance with the principles of this invention.

FIG. 1 shows the chain transport routes in an illustrative resin application system using the principles of this invention. With reference to this FIG., transport chain 10 having holding devices according to the principles of this invention, by means of intermittent advancement in direction 10''', achieves transport from position 11, where a load device transfers dynamo-electric machine components to be coated with resin and components which have been coated between a main manufacturing line (not shown) and the holding devices of this invention. In the embodiment shown in the drawings, the dynamo-electric machine components are assumed to be electric motor armatures, but it will be understood that other types of components (e.g., stators) can be processed in accordance with the invention if desired.

After position 11 the chain continues to transport through pre-heating oven 12, where the components (e.g., armatures) are heated to a temperature required for the successive resin coating operation. Once the armatures leave the oven, in position 13 they are unloaded from stretch 10 and placed in holding devices like those shown in FIG. 4 of U.S. Pat. No. 5,443,643, belonging to a separate transport chain 14 required for transferring the armatures to resin application station 15. In station 15 dispensers apply the resin in the way that has been described previously for traditional resin application systems. (Note again that station 15 could be a resin bath raised and lowered from below the armatures, rather than resin dispensers dropping resin from above the armatures.) To transfer the armatures to the resin application station, chain 14 has a closed loop extension returning to position 13 and advances intermittently in direction 14'.

In position 13, an important transfer operation occurs during the waiting period between two successive advancements of chains 10 and 14, which need to be synchronized. More particularly, an armature to be coated with resin is transferred from a holding device of this invention fixed to chain 10 to a traditional holding device of chain 14, and vice versa a coated armature is transferred from a traditional holding device of chain 14. These two exchanges of armatures occur in succession and between the same holding devices of the chains. In other words, for each armature to be coated which is unloaded from transport chain 10 and loaded on to transport chain 14, a coated armature is unloaded from transport chain 14 and loaded onto transport chain 10, and these armatures exchange their respective holding devices.

The coated armatures which have been transferred to transport chain 10 travel back to position 11 so that they can be unloaded to the main manufacturing line. During this transfer, gelification of the resin can occur if the resin being used requires this type of process.

Other chain routes before and after position 13 in FIG. 1 are possible with the principles of this invention, and additional equipment, not shown in FIG. 1, may be present. For example, during a gelification process, it may be desirable to rotate the components to avoid accumulation of resin in certain areas due to the force of gravity so that the resin will be uniformly distributed within and over the coils. Then, the conventional type of holders, such as those shown in FIG. 4 of U.S. Pat. No. 5,443,643, may be used in the gelification process. The gelification process may therefore be advantageously performed along transport chain 14 downstream from coating apparatus 15. Once the resin is no longer likely to flow under the influence of gravity, the armatures can be transferred back to transport chain 10 at position 13. Further processing of the armatures can then be performed along transport chain 10 downstream from position 13. For example, this further processing may include passing the armatures through a curing oven for further hardening the resin, and then passing the armatures through a cooling plant for restoring the armatures to ambient temperature before they are returned to the other armature processing apparatus at position 11.

Different types of transfers may be used at locations like position 13 in FIG. 1. For example, conveyors 10 and 14 may be side by side or end to end rather than one above the other at component transfer location 13. In the case of resin application by a bath, it may be preferable to simultaneously transfer several armatures between conveyors 10 and 14 at position 13 (because it may be more efficient to batch several armatures for simultaneous treatment in a bath). Also, in that case each advance of conveyor 14 may be equal to the spacing of several holders (rather than the spacing of just one holder). Depending on the type of resin being used, it may not be necessary to have a preheating oven 12 before coating station 15, but a heating oven may be required after the coating station.

Accordingly, chain routes, conventional holders, and holding devices of this invention may be combined in a variety of ways in accordance with the principles of this invention. By means of these principles the present invention reduces the number of traditional holders to just those required on the limited stretch of transport chain 14 required for transfer to the resin dispensing station and closely associated processes such as gelification as described above.

Figure 2:
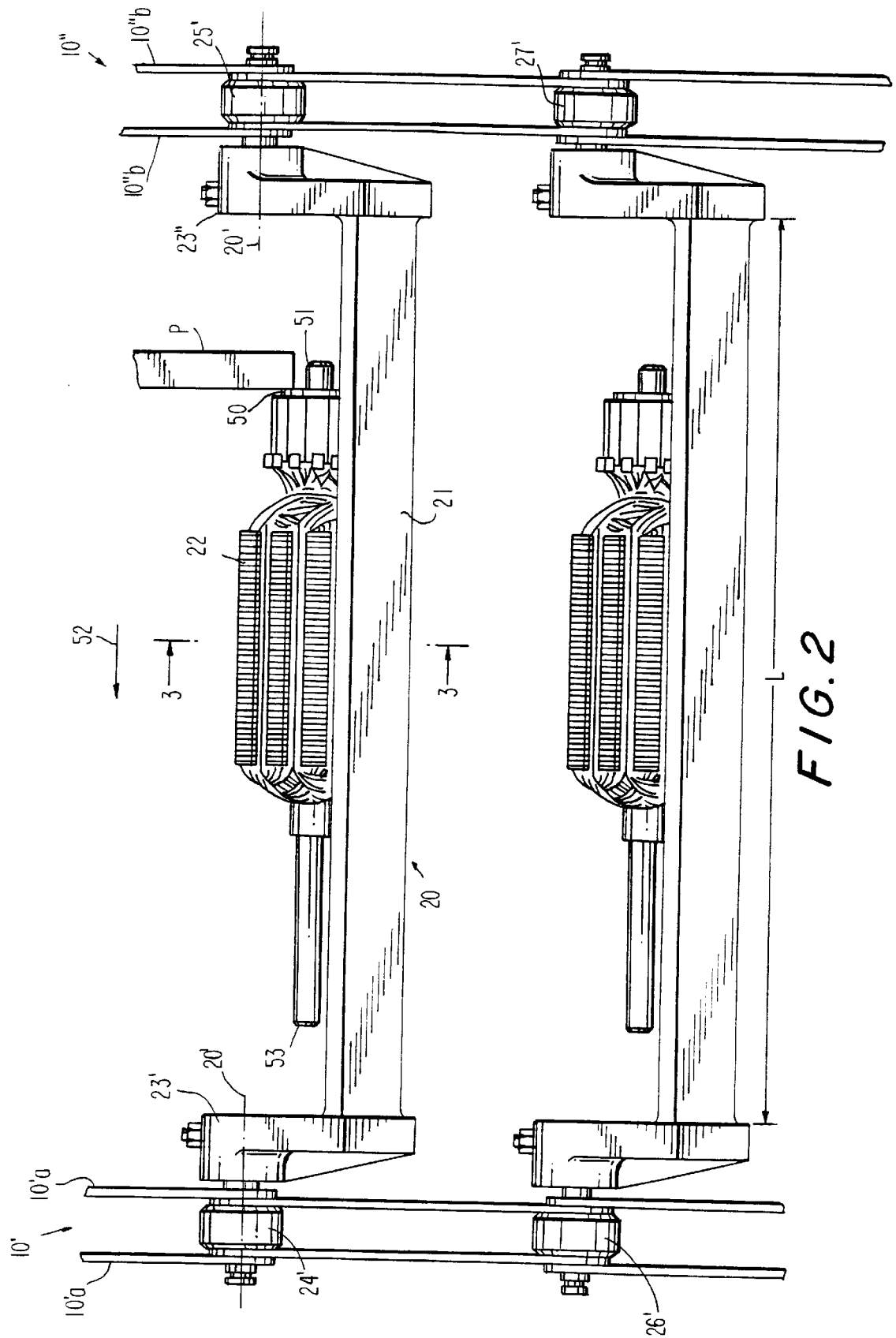
FIG. 2 is an elevational view of two successive, illustrative, holding devices fixed to a transport chain in accordance with the principles of this invention.
Figure 4:
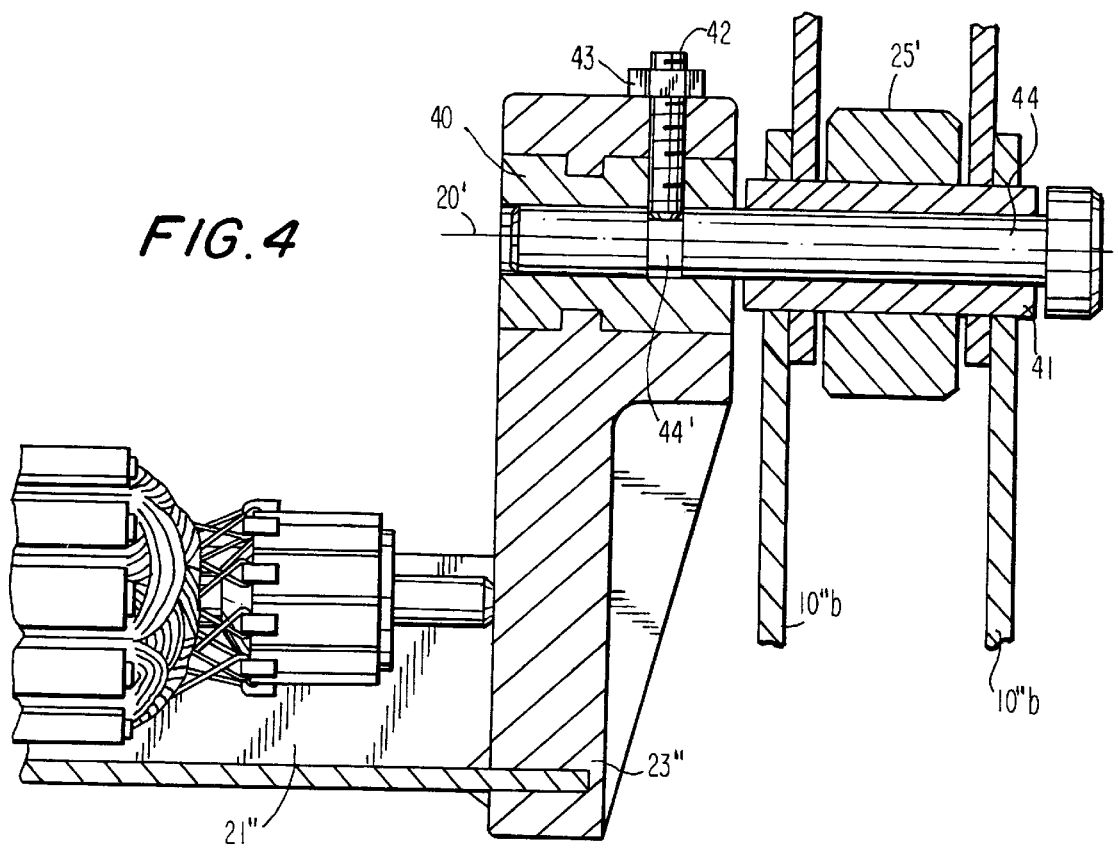
FIG. 4 is a partial sectional view of a holding device in accordance with the principles of this invention, taken generally along the line 4—4 in FIG. 3, although
Figure 3:
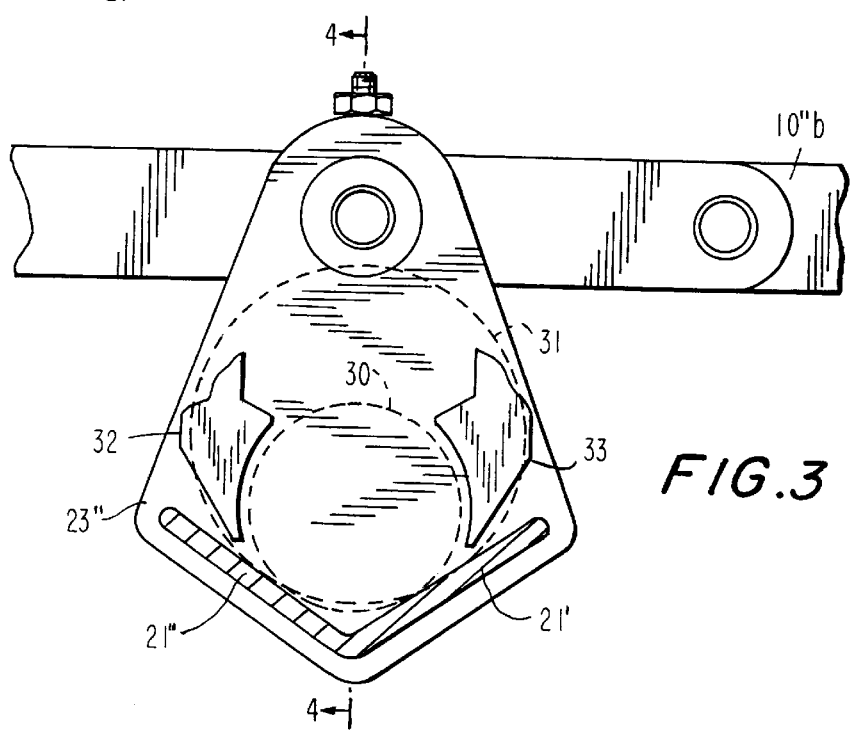
FIG. 3 is a sectional view taken generally along the line 3—3 in FIG. 2, although

With reference to FIGS. 2–4, an illustrative holder in accordance with this invention for use on transport chain 10 has a main case aluminum body 20 with a transverse portion 21 for supporting the ferro-magnetic core or stack 22 of the armature that is being carried. The coils of the armature are wound on the stack. The transverse portion has a V section consisting of extensions 21' and 21" for providing support contacts with the armature stack. The armature is supported in this transverse portion due to the contact of its stack 22 with these extensions 21' and 21". This contact is maintained by the weight of the armature. At the ends of the transverse portion there are upward portions 23' and 23" which include devices for connecting the holder to the transport chain. The transport chain consists of two spaced stretches of chain 10' and 10" having links 10'a and 10"b and rollers 24', 25', 26' and 27'. Rollers 24'–27' run on surfaces placed along the route of conveyor 10 which is shown in FIG. 1 so that proper travel without excessive friction and deformation of the chain can be achieved.

With reference to FIG. 3 circles 30 and 31 represent the outer contour of two extreme armature stack diameters of a range of armatures which can be supported by the holder. The holder does not need adjustments to be able to support any of the stack diameters belonging to this range. Grippers like 32 and 33 are used to grasp the stack 22 of an armature when it is necessary to transfer the armature at locations like 11 and 13 in the system shown in FIG. 1.

FIG. 4 shows the devices for connecting the holder to the transport chain. With reference to this FIG., upward portion 23" has a transverse bore in which a hard metal support bush 40 is permanently fixed. Bush 41 is assembled in a bore passing through the links of the chain and through roller 25'. Hinge pin 44 is passed through bush 41 and through support bush 40 which are co-axial. Screw 42, fastened by nut 43, extends into groove 44' of the hinge pin and together with abutment head 44" impedes it from moving along the length of both the bushes. In this way the holder is fixed to the hinge pin, while the hinge pin is free to rotate in bush 41. A similar structure is present on upward portion 23' for connecting the other side of the holder to chain 10'.

By means of this technique for connecting the holder to the chains, the holder is able to swing around axes 20' under the weight of the armature which it is carrying. This guarantees that the holder remains with the V portions 21' and 21" facing upwards, thus carrying an armature in a stable way even when the chain travels around curves to change its travel direction as is required in points referenced C in FIG. 1.

When it is required to position an armature which is being transported by a holder in a precise and predetermined position along transverse width L, an external pusher like P can be used to contact either the back end of the commutator as at 50 or with the tip of the armature shaft 51 to push the armature in direction 52 and parallel to transverse width L so that the opposite tip 53 of the armature shaft comes into abutment with the inner side of upward portion 23'. By doing this the armature can be precisely referenced within the holder for loading and unloading using grippers 32 and 33, which need to be precisely aligned with a predetermined portion of the armature stack 22.

Figure 5:
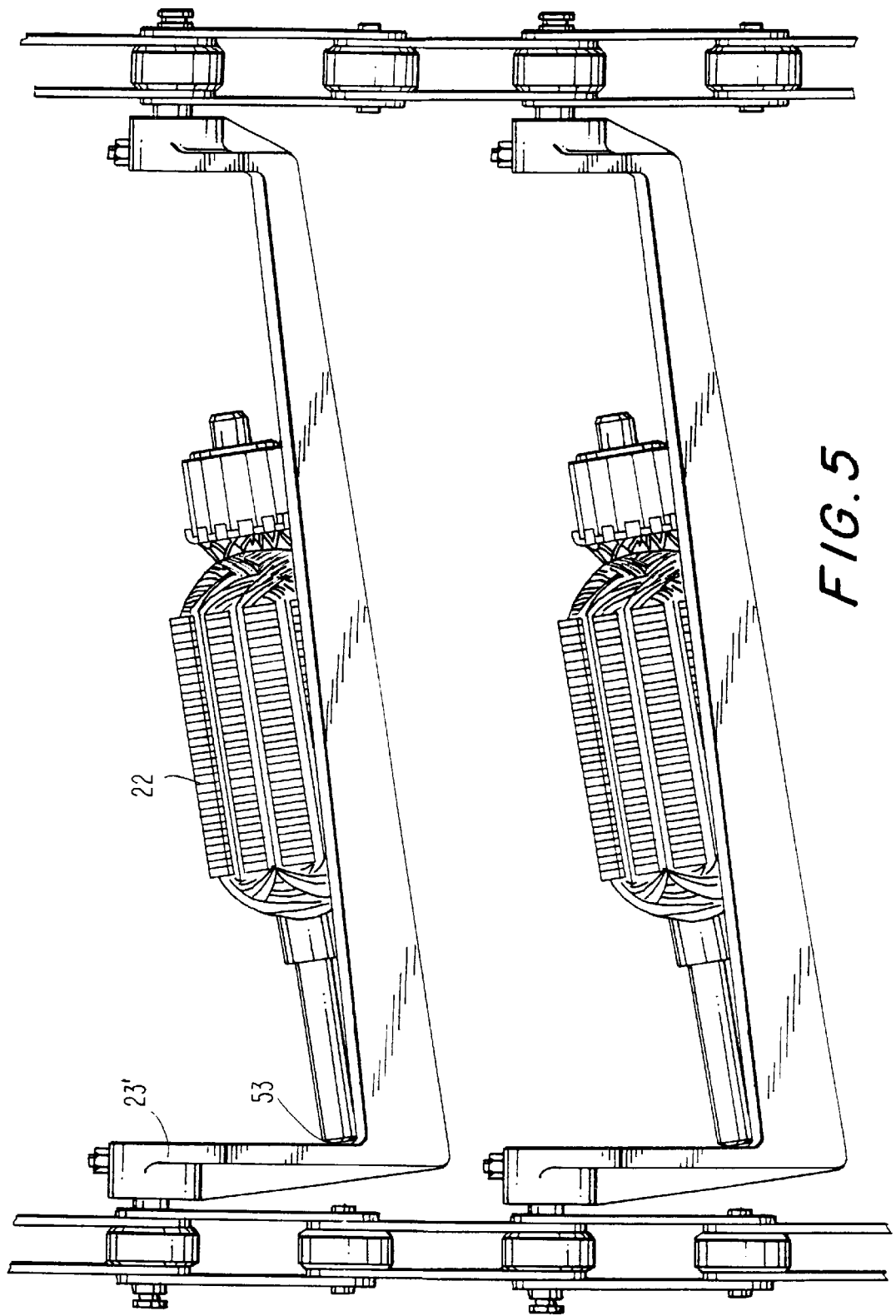
FIG. 5 is a view similar to FIG. 2 showing another illustrative embodiment of holding devices constructed in accordance with the principles of this invention.

In FIG. 5, which is similar to the view of FIG. 2, a slightly different version of holder 20 is shown with a transverse portion that is slightly inclined. The armatures which are placed in the holder of FIG. 5 will slide by gravity towards the left of that FIG. so that opposite shaft tip 53 will be permanently in abutment with the inner side of upward portion 23' when the armature is being carried. This avoids the use of external pusher P for referencing the armatures.

Figure 6:
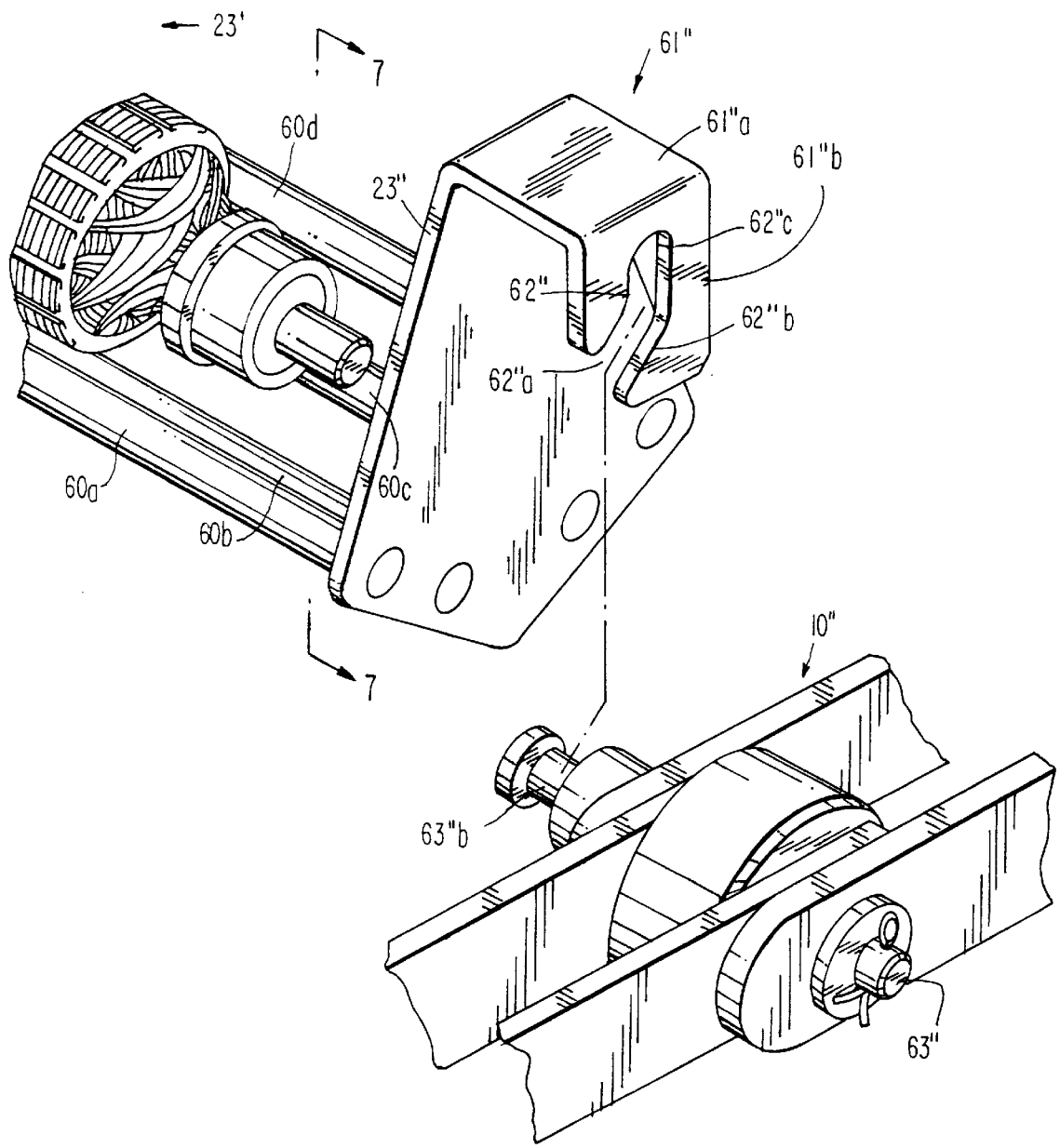
FIG. 6 is a partial, partly exploded, isometric view of an alternative illustrative embodiment of a holding device in accordance with this invention.
Figure 7:
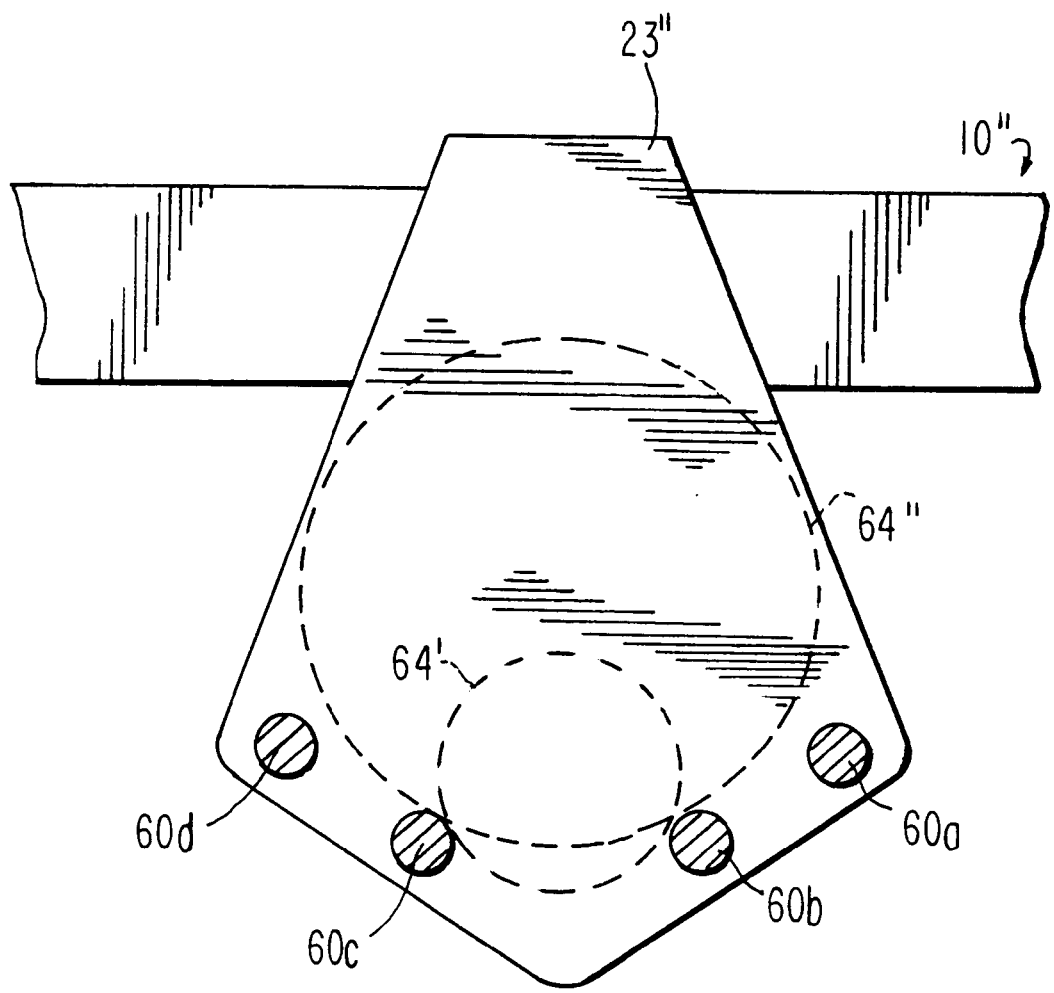
FIG. 7 is a sectional view taken along the line 7—7 in FIG. 6.

An alternative solution for a holding device used on transport chain 10 in FIG. 1 is shown in FIGS. 6 and 7. In this holding device, cylindrical bars 60a, 60b, 60c and 60d form the transverse portion 21 which supports an armature by its stack 22. These bars connect upward portion 23' (not shown) to an opposite upward portion 23" shown in FIGS. 6 and 7. Upward portion 23" has device 61" for connecting the holder to transport chain 10".

Device 61" is an extending portion of the same plate structure which forms upward portion 23". More particularly, device 61" includes horizontal plate portion 61"a and continues with downwardly directed vertical plate portion 61"b. Portion 61"b is machined by means of a milling operation to have slot 62" for receiving circumferentially reduced portion 63"b of pin 63" mounted on chain 10". Slot 62" is configured to have entrance 62"a, inclined portion 62"b and cylindrical portion 62"c.

Similarly, upward portion 23' (not shown) will have an identical connection device 61' (not shown) facing oppositely to 61" for mounting of the opposite side of the holder to a circumferentially reduced portion of a pin 63' (not shown) fixed to chain 10'. Connection device 61' will have an identical slot 62' with entrance 62'a, inclined portion 62'b and 62'c (all not shown) for receiving the circumferentially reduced portion of pin 63'.

The holding device of FIGS. 6 and 7 can be easily and quickly connected to chains 10' and 10" by means of a manual operation. To do this, entrances 62'a and 62"a are first aligned with circumferentially reduced portions of pins 63' and 63". Then the holding device is moved toward pins 63 to allow the circumferentially reduced portions to run along the inclined portions 62b and to finally reach the cylindrical portion 62c where they become definitely seated. In this way, the manual operation obtains connection of the holding device to pins 63 in a definite manner for transport of an armature by movement of the chain. The fits of the sides of the slots 62 with respect to the reduced portions 63b of the pins are loose to allow the connections to be made without difficulty, without tools, and to reach a final condition where the holding device can swing on the reduced portions of the pins during movement of the chain. The position of the center of gravity and the weight of the holding device shown in FIGS. 6 and 7 will maintain the reduced portions of pins 63 seated in the cylindrical portions 62c of the slots at all times during transport by the chain. The additional weight of the armature being transported further assures this condition.

FIG. 7 shows how different sizes of armature stack 64' and 64" are supported under their weight on bars 60b and 60c. These bars are connected to upward portions 23' and 23" by inserting the ends of the bars in bores of the plate structure forming the upward portions. Covering weld points over the ends of the bars and to the plate structure once they have been seated in the bores make the connections rigid and permanent. Bars 60a and 60d act as abutment sides to the stack if the armature tends to topple off bars 60b and 60c.

Bars 60*a* and 60*d* also act as centering surfaces when the armatures are loaded into the holding device. Bars 60*b* and 60*c* have smooth external surfaces in contact with the armature stack to facilitate sliding for referencing as has been described for FIGS. 2 and 5.

The holding device of FIGS. 6 and 7 needs less metal material to manufacture and leaves open the areas between the bars. These characteristics make this type of holding device less expensive to manufacture, lighter for transportation, easier to heat, and more open to air circulation around an armature on the holding device when passing through a heating oven. The easy and quick connection of the holding device to the chain makes cleaning, repair, and substitution operations more efficient.

Figure 8:
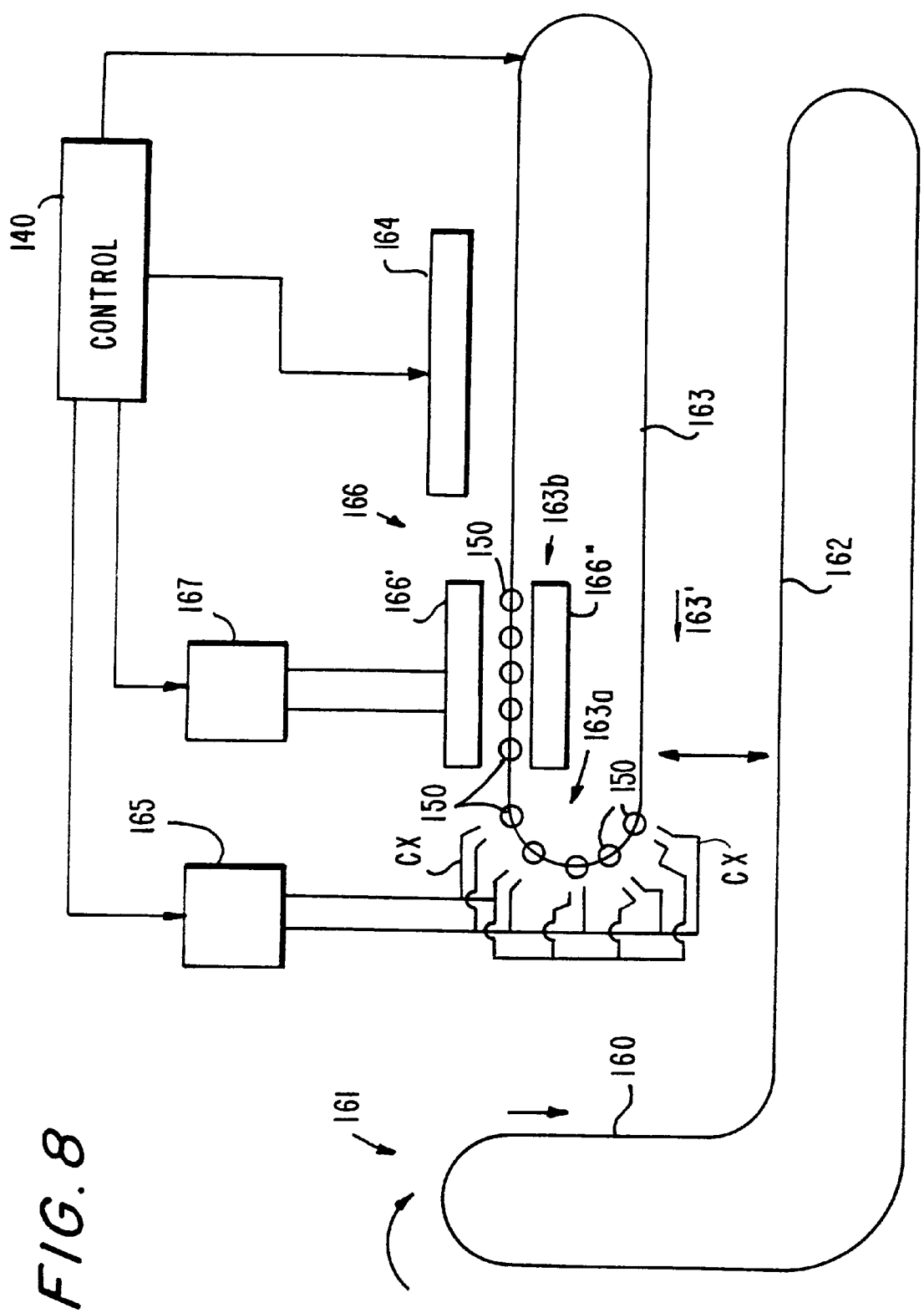
FIG. 8 is a schematic view of an alternative resin coating system in accordance with the invention.

FIG. 8 shows an impregnation system where preheating of the armatures using the hot air oven 12 shown in FIG. 1 is substituted by more rapid electrical and electromagnetic heating.

In the system shown in FIG. 8, the armatures are loaded in holding devices of first transport chain 160 by a load device operating at point 161. Transport 160 and its holding devices may be similar to transport 10 and its holding devices in FIGS. 1–7. From point 161 the armatures travel to point 162 where they are transferred to holding devices of transport chain 163. Transport 163 and its holding devices may be similar to transport 14 and its holding devices in FIG. 1. By means of intermittent advancements in direction 163', transport chain 163 transfers the armatures to station 164 wherein resin application of the coils occurs. For example, in station 164 liquid resin may be dripped on the coils of the armature. A liquid resin bath is a possible alternative to such dripping application of the resin. Between point 162 and station 164, the armatures 150 are heated in travel portions 163*a* and 163*b* while they are held by the holding devices of transport chain 163.

More particularly, two opposite commutator bars of each armature 150 being transported through travel portion 163*a* of the chain are contacted by a respective contactor cx connected to current supply unit 165 so that electrical current can be made to flow through the armature coil(s) that are connected between those commutator bars. Unit 165 supplies current at a set value through these contactors to make the current circulate through the wires forming the coils of the armatures. This circulation causes a predetermined joule heating effect due to the electrical resistance of the coils.

Within travel portion 163*a*, for each position which becomes occupied by a holding device, this contact occurs by means of respective permanently located contactors cx connected to unit 165. Therefore, for each intermittent advancement of chain 163, an armature 150 present in travel portion 163*a* will have its commutator contacted for the current circulation as many times as there are holding device positions with these contactors. The current circulation occurs during the waiting time between two consecutive advancements of the chain, which means that the global heating of an armature in travel portion 163*a* will occur by means of a series of successive supplies from unit 165 which are synchronized with the intermittent advancement of chain 163.

After portion 163*a* the armatures 150 travel within travel portion 163*b* where an electromagnetic field is generated by a horizontal coil 166 connected to a high frequency current supply unit 167. The coil has horizontal portions 166' and 166", respectively above and below the holding devices to create the electromagnetic field. This electromagnetic field induces a passage of parasitic electrical currents through the lamination stack or core of the armatures 150. These parasitic currents generate induction heating of the core of the armatures. Additional induction heating of the core results from magnetic hysteresis in the core induced by the electromagnetic field of coil 166. The frequency of the current from supply 167 to achieve the induction heating is preferably about 20 Khz.

The combination of the two heating techniques which have been described (i.e., electrical resistance heating of the coils and electromagnetic induction heating of the core) greatly reduces the time required to heat the armature for the resin application in station 164. Consequently, the reduction of this time achieves a reduction of the length of the transport chain, the number of holders, and the floor space which need to be dedicated to heating the armatures in the impregnation system.

Figure 9:
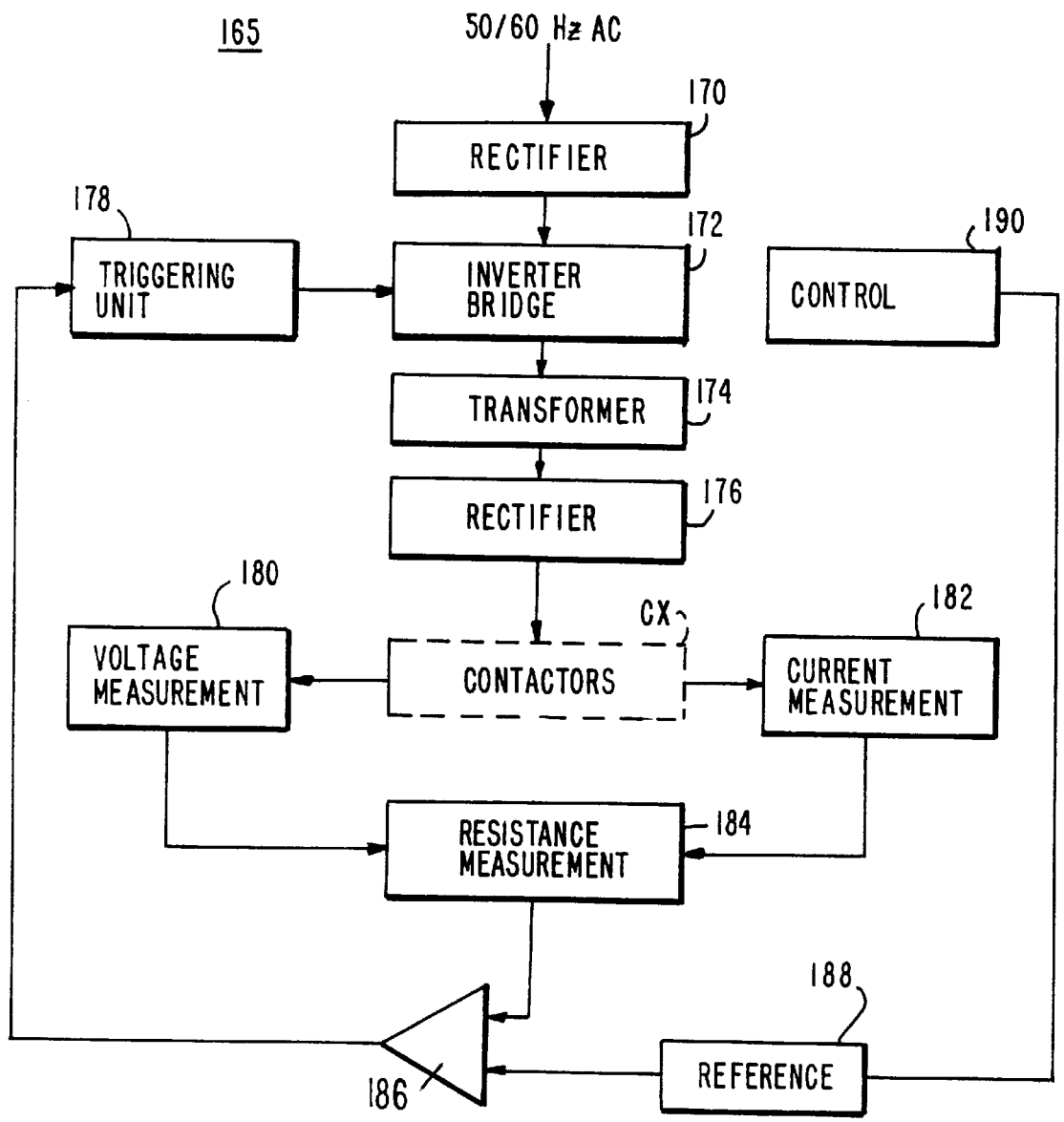
FIG. 9 is a block diagram of an illustrative embodiment of a portion of the apparatus shown in FIG. 8.

The joule heating effect can be obtained by making a direct current circulate through the wire coils of the armature in travel portion 163*a*. The direct current can be obtained by using an inverter/rectifier unit 165 to which the contactors cx are connected. More particularly, and as shown in FIG. 9, such a unit 165 may include a rectifier connected to the commercial mains supply (50 or 60 Hz AC) to produce a rectified impulsive current. This rectified current is supplied to an inverter bridge 172 for producing again an alternating current, although regulated. This second alternating current is passed through a transformer 174 for reducing its voltage, and then through a second rectifier 176 which rectifies it to the DC current which is passed through the contactors cx for generating the joule heating effect in the wire coils. A triggering unit 178 triggers the inverter bridge 172 based on power width modulation in order to regulate the current circulating within the wire coils.

Typically, the current regulation is of the closed loop type, where the feedback parameter is the instantaneous electrical resistance being measured within the wire coils. The regulation of the current obtained by the triggering occurs to follow a desired predetermined electrical resistance of the wire coils. This predetermined performance guarantees that the temperature within the wire coils also follows a predetermined performance. The temperature performance safeguards against excessive temperature generation within the wire coils and ensures that a required heating effect occurs with desired timing. For example, the electrical resistance feedback measurement may be accomplished by using voltage measuring circuit elements 180 to measure the voltage between the contactors cx, and by using current measuring circuit elements 182 to measure the current passing through the contactors. The current and voltage measurements are applied to resistance measuring circuit elements 184, which determine the electrical resistance of the wire coils from the applied current and voltage values. The current regulation occurs by computing or otherwise determining the error (circuit elements 186 output) between the desired electrical resistance (reference 188) and the actual measured electrical resistance (circuit elements 184 output), and then increasing or decreasing the current by means of the power width modulation (triggering unit 178) which alters the duty cycle of the inverter output current. Timing and level controls for the operation of inverter/rectifier unit 165 are provided by control circuit elements 190. Other types of units which allow for regulated direct current supply can be used in place of inverter/rectifier unit 165.

Figure 10:
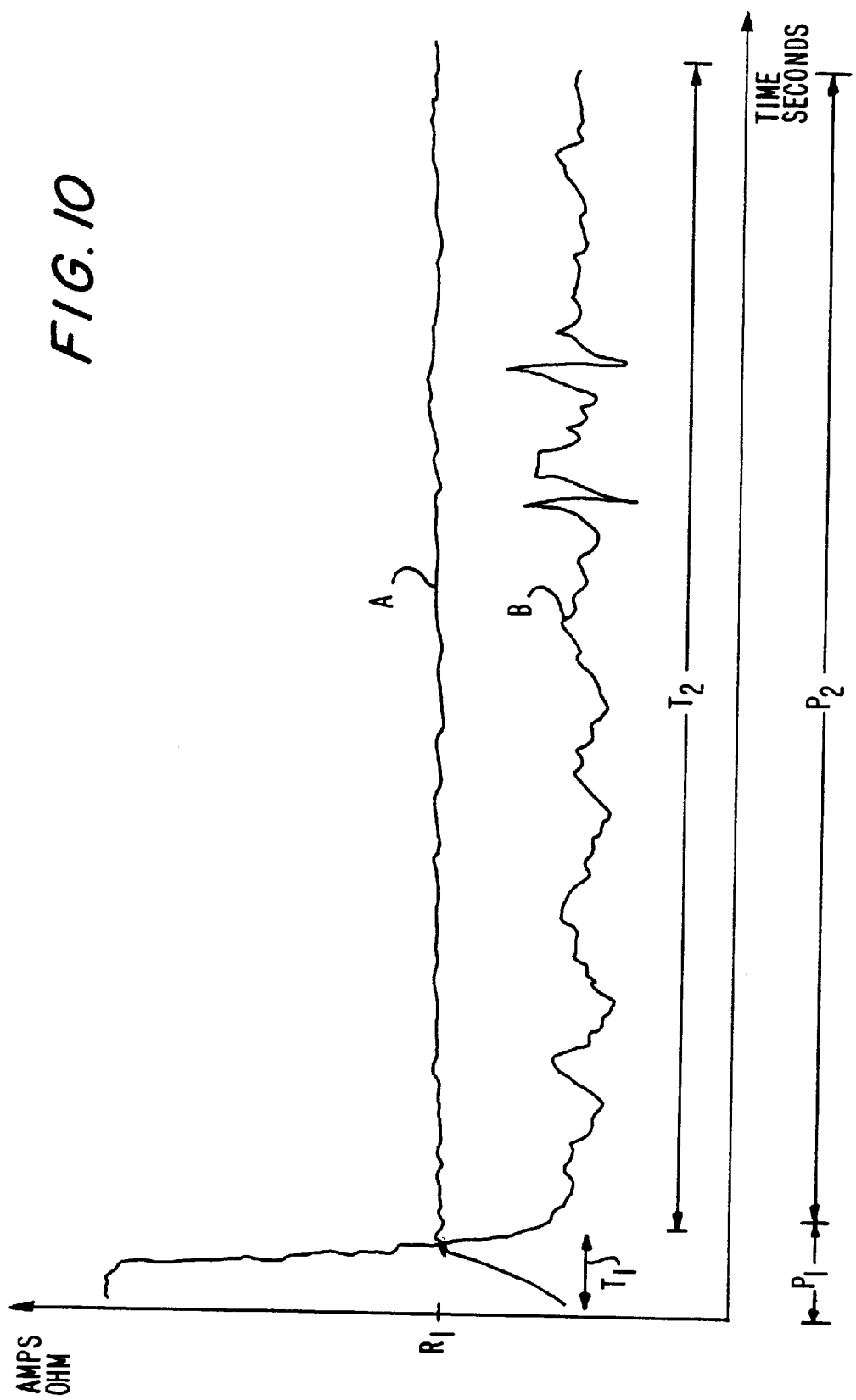
FIG. 10 is a graph of current and resistance versus time that is useful in explaining certain aspects of the operation of the FIGS. 8 and 9 apparatus.

FIG. 10 shows graphs of the electrical resistance (line A) of the coils and the regulated current passage through them (line B) for the same electrical resistance course in time.

Line A shows electrical resistance increasing in portion P1 to reach a desired top electrical resistance value R1 in timing T1. This is the heating ramp to bring the coils to a desired top temperature. In portion P2 the electrical resistance is maintained constant for time T2 in order to maintain the required top temperature in the wire coils.

Line B shows the current which is being regulated to follow the electrical resistance course which has been described above. Initially, in portion P1, the current is very high and drops rapidly as the electrical resistance increases. Then in portion P2 the current oscillates frequently on either side of a certain value to maintain a required temperature in the wire coils.

The electrical resistance path, or in other words the heating effect performance, may be found experimentally and depends on the size of the armature, the wire used to wind the coils, and the resin which needs to be applied during impregnation. The objective is to heat the wires of the coils to a temperature which allows the resin applied during impregnation to migrate well between the wires and to heat the resin (through its contact with the wires) to a temperature which will cause it to solidify after impregnation.

An excessive temperature of the wires will cause the resin to overheat and this may produce unwanted gas bubbles that remain between the wires. Overheating may also cause a premature solidification of the resin before complete migration has been accomplished. A low temperature in the wires may prevent the resin from solidifying after impregnation.

The induction heating (apparatus 166 in FIG. 8) basically produces heat in the lamination stack where the wire coils are disposed in slots. The lamination stack portions adjacent to the wire and which come into contact with the resin supplied during the impregnation need to be brought to the same temperature as the wires. This is required to guarantee that any resin in contact with these areas will be transformed correctly. With induction heating a temperature gradient as small as possible is created between the wire coils and their surroundings. This also avoids fast dispersion of the heat which the wire coils receive the joule heating effect. Therefore, induction heating contributes to decreasing the time required to bring the wire coils to the temperature required for impregnation.

Although FIG. 8 shows induction heating after resistance heating, induction heating can alternatively be applied prior to carrying out the joule effect heating so as to perform the latter in a condition where the surroundings of the wire coils are at a high predetermined temperature. Induction heating and joule heating can also be applied at the same time to heat the wire coil. This possible simultaneous application of current through the wire coils and the presence of a yoke for the induction heating (described in the following) can produce a magnetic field which attracts the armature toward the yoke. This may cause instability in holding the armature and the danger of not respecting a certain separation which should exist between the yoke and the armature. To cancel this effect, the armature needs to be positioned with its neutral zone at a right angle to the attraction field.

Figure 11:
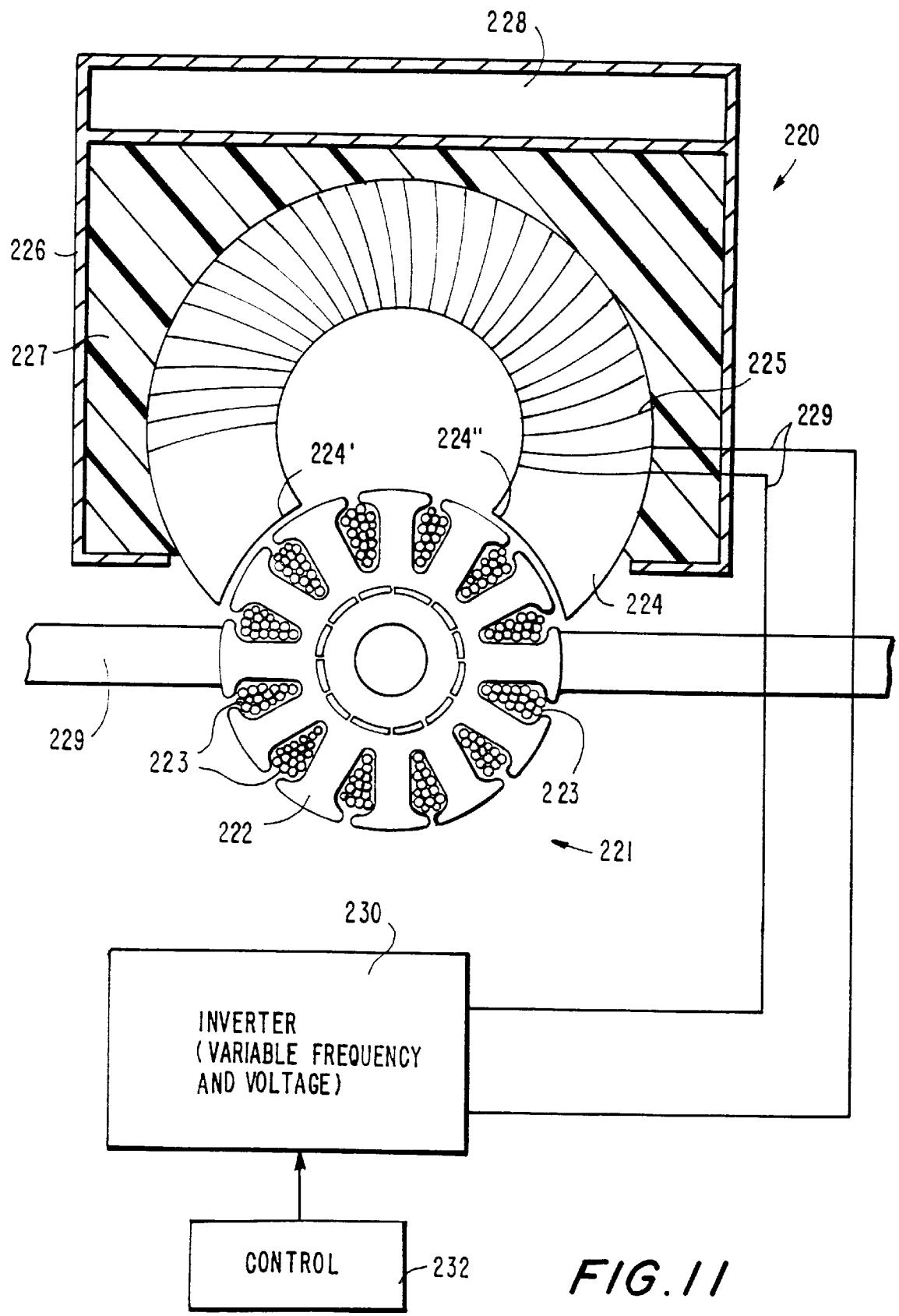
FIG. 11 is a simplified elevational view, partly in section and partly schematic, of an illustrative embodiment of another portion of the FIG. 8 system.

FIG. 11 shows a particularly preferred apparatus 220 for applying induction heating to armature 221, and in particular to the lamination stack or core 222 on which wire coils 223 are wound.

A sector of an annular, silicon iron yoke or core 224 is provided with induction coil 225 wound around it to produce an electromagnetic field through the gap between core ends 224' and 224". As shown in FIG. 11, the lamination stack 222 is positioned with its outer surface adjacent, with a certain separation, to ends 224' and 224" to obtain the induction heating effect. The armature is held in this position by holding the ends of its shafts with holding devices fixed to the spaced apart and opposite transport chains 229 of the impregnation system. Only one chain is shown in FIG. 11. The other chain would be parallel to the chain shown in FIG. 11 and out of the page, toward the reader.

The yoke 224 is fixed to supporting casing 226 by being embedded in an electrically non-conductive, although heat conductive, resin 227. A chamber 228 for the circulation of cooling liquid is also provided in the casing to reduce the accumulation of heat being produced in the yoke during induction heating.

The electromagnetic field passing through ends 224' and 224" closes itself in the lamination stack of the armature. In the lamination stack this field produces electrical eddy currents and magnetic hysteresis, and it is these phenomena that produce the induction heating effect. The armature may be rotated by the holding devices during the generation of the electromagnetic field so that the resulting induction heating effect is uniformly distributed throughout the lamination stack.

To generate the above-described electromagnetic field, leads 229 of coil 225 are connected to an inverter unit 230 to receive an alternating current which can be changed in frequency. The induction heating effect depends on the frequency of the supply to coil 225. Inverter 230 preferably allows this frequency to be changed (e.g., under the control of control circuit elements 232). The choice of the right frequency to use for the induction heating effect may be made through experimentation and depends on the type of resin being used for impregnation, the size of the armature, and the size of the coil wire. An excessive frequency can produce unwanted high temperatures in the yoke which generate inefficient heat dispersion. Inverter 230 can be regulated in voltage (again by control circuit elements 232) so that it produces a required electrical power performance curve for a required time in order to produce correct induction heating. The correct electrical power curve may be found by experimentation.

The application of the resistance and induction heating to the armature will be synchronized with the movement of the transport chain (e.g., by control circuit elements 140 in FIG. 8). When the chain moves to move forward the armatures, the contactors cx for supplying the joule effect current and the yoke 224 will interrupt the heating generation. When the chain stops, which results in positioning the armatures in relation to the contactors and the yoke, the heating effects are applied again. As in the case of the multiple contact positions cx, the system may include multiple yokes 224 for induction heating of armatures at several positions along conveyor 163.

It will be understood that the foregoing is only illustrative of the principles of the invention, and that various modifications can be made by those skilled in the art without departing from the scope and spirit of the invention. The described embodiments are presented for the purpose of illustration rather than limitation, and the present invention is limited only by the claims which follow.

What is claimed is:

1. Apparatus for impregnation with initially liquid resin of wire coils wound on a core of a dynamo-electric machine component comprising:

electrical circuitry configured to cause an electrical current to flow through the coils to heat the coils by electrical resistance heating;

electromagnetic induction components configured to heat the core by electromagnetic induction heating; and resin applying components configured to apply liquid resin to the coils so that the resin flows into spaces between the wires in the coils.

2. The apparatus defined in claim 1 wherein the dynamo-electric machine component is a dynamo-electric machine rotor, and wherein the electrical circuitry comprises:

electrical contacts configured to contact spaced locations on a commutator of the rotor which are electrically connected to one another via the coils on the rotor.

3. The apparatus defined in claim 1 wherein the electromagnetic induction components comprise:

a pole structure having a gap between pole ends which is configured to receive at least a portion of the core in the gap between the pole ends;

an induction coil wound around the pole structure; and an alternating current electrical energy source configured to apply alternating current electrical energy to the induction coil.

4. The apparatus defined in claims 3 wherein the electromagnetic induction components further comprise:

a heat sinking structure substantially surrounding and in thermal contact with the induction coil, the heat sinking structure being configured to convey heat away from the induction coil.

5. The apparatus defined in claim 3 wherein the alternating current electrical energy source comprises:

an inverter circuit connected to a commercial source of alternating current electricity and configured to produce the alternating current electrical energy with variable frequency and variable voltage.

6. The apparatus defined in claim 1 wherein the resin applying components comprise:

a structure for dripping the resin onto the coils.

7. The apparatus defined in claim 1 further comprising:

a conveyor configured to intermittently advance the dynamo-electric machine component relative to the electrical circuitry, the electromagnetic induction components, and the resin applying components.

8. The apparatus defined in claim 7 wherein the conveyor comprises:

component-carrying holders configured to selectively rotate a dynamo-electric machine component on the conveyor.

9. The apparatus defined in claim 7 wherein the electrical circuitry comprises:

a plurality of sets of electrical contacts configured to apply the electrical current to coils of the dynamo-electric machine component at respective successive positions of the dynamo-electric machine component as the conveyor intermittently advances the dynamo-electric machine component relative to the electrical circuitry.

10. The apparatus defined in claim 1 wherein the electrical current which the electrical circuitry is configured to cause to flow through the coils is substantially direct current.

11. The apparatus defined in claim 1 wherein the electromagnetic induction components operate at a frequency of approximately 20 KHz.

12. The apparatus defined in claims 1 wherein the electrical circuitry and the electromagnetic induction components operate on the dynamo-electric machine component substantially simultaneously.

13. The apparatus defined in claims 1 wherein the electrical circuitry comprises:

a rectifier configured to rectify commercially supplied alternating current electricity;

an inverter bridge configured to regulate the rectified electricity produced by the rectifier;

a transformer configured to reduce the voltage of the regulated electricity produced by the inverter bridge; and a second rectifier configured to rectify the reduced voltage electricity produced by the transformer to produce the electrical current.

14. The apparatus defined in claim 13 wherein the electrical circuitry further comprises:

a triggering unit configured to trigger the inverter bridge based on power width modulation.

15. The apparatus defined in claim 13 wherein the electrical circuitry further comprises:

current regulation circuitry configured to regulate the electrical current applied to the coils based on monitoring the electrical resistance of the coils to which the electrical current is being applied.

16. The apparatus defined in claim 15 wherein the current regulation circuitry comprises:

first circuit elements configured to measure voltage between points at which the electrical current enters and leaves the coils;

second circuit elements configured to measure the electrical current flowing through the coils; and analysis elements configured to determine the electrical resistance of the coils from the voltage and current measured by the first and second circuit elements.

17. The apparatus defined in claim 16 wherein the current regulation circuitry further comprises:

error detection circuitry configured to detect any difference between the electrical resistance determined by the analysis elements and a desired electrical resistance.

18. The apparatus defined in claim 17 wherein the current regulation circuitry further comprises:

control circuitry configured to modify a duty cycle of the inverter bridge in accordance with the difference detected by the error detection circuitry.

19. The apparatus defined in claim 1 wherein the electrical circuitry is controlled to heat the coils to a temperature that is high enough to promote flow of the resin into the spaces between the wires and subsequent solidification of the resin, but not so high as to cause premature solidification of the resin or gas bubble formation in the resin.

20. The apparatus defined in claim 1 wherein the electrical circuitry and the electromagnetic induction components are controlled to respectively heat the coils and the core to approximately the same temperature.

21. The apparatus defined in claim 20 wherein circuit elements using current regulation adjust the temperature to be high enough to promote flow of the resin into the spaces between the wires and subsequent solidification of the resin, but not so high as to cause premature solidification of the resin or gas bubble formation in the resin.

22. The apparatus defined in claim 1 wherein the electrical circuitry is further configured to operate on the coils before the electromagnetic induction components operate on the core.

23. The apparatus defined in claim 1 wherein the electromagnetic induction components are configured to operate on the core before the electrical circuitry operates on the coils.

* * * * *